United States Patent Office 3,219,639
Patented Nov. 23, 1965

3,219,639
POLYMERIC QUATERNARY AMMONIUM SALT COMPOSITIONS AND METHOD OF MAKING THE SAME
Walter M. Fuchs, deceased, late of Aachen, Germany, by Frieda W. Fuchs, Aachen, Germany, sole heir, and Paul Stamberger, Baltimore, Md.; Frieda W. Fuchs assignor to Crusader Chemical Co., Inc., New York, N.Y., a corporation of New York
No Drawing. Filed May 12, 1961, Ser. No. 117,488
The portion of the term of the patent subsequent to May 16, 1978, has been disclaimed
7 Claims. (Cl. 260—80.5)

This application is a continuation-in-part of our application Ser. No. 401,735, filed December 31, 1953, issuing May 16, 1961, as Patent No. 2,984,639, the aforesaid application itself being a continuation-in-part of our application Ser. No. 368,832, filed July 17, 1953.

This invention relates to a new type of composition consisting of the reaction product of a polymeric component of an anionic nature, with a substituted ammonium derivative which will react as a cation, forming water insoluble compounds with the anionic polymer.

The polymeric anion component consists of an addition or condensation polymer which contains active hydrogen, so as to be capable of salt formation with the cationic substituted ammonium derivative, the polymers being high molecular weight homopolymers or copolymers derived from ethylenically unsaturated compounds, such as vinyl esters and ethers, acrylates and methacrylate, styrene, etc.

The object of the present invention is to modify over a wide range, the properties of the polymeric anionic composition, by reacting the anionic radical in the polymer with the cationic radical of the substituted ammonium compound. The reaction takes place as a salt formation and is of metastatic nature.

Another object of the invention is to react polymeric anionic compounds with the cationic radicals of substituted ammonium compounds to provide these polymers with plasticized properties of chemical, rather than physical nature.

A further object of this invention is to produce dispersions of such polymers in water which can be further diluted for use in impregnating, coating and sizing.

A still further object of this invention is to produce coating material for coating rigid and flexible surfaces, such as textiles and paper, and rigid or flexible plastic material.

The objective of this invention is achieved by the modifying influence of the salt-forming quaternary ammonium derivatives which are combined with the polymer and thus form an integral part of the polymeric molecule. Consequently, the plasticizing cannot be affected by physical means. The products obtained in accordance with the invention possess numerous advantages. Besides plasticizing the polymeric component, the new reactive radical introduced in the molecule is capable of reacting with other chemical components, for example, epoxies, isocyanates, or the like, and in general, are capable of entering into reactions which can be carried out with the substituted ammonium as reactive center.

The polymeric film produced from the reaction product of this invention also may serve as an antistatic coating, since the cationic ammonium derivative attached to the polymeric chain makes the surface electro-conductive.

In the above-mentioned copending applications, it is disclosed that polymers containing active hydrogen may be reacted with quaternary ammonium compounds in which one alkyl substituent on the nitrogen is a long chain alkyl of ten or more carbon atoms, to form water-insoluble salts.

Depending upon the chain length and the chemical nature of the alkyl or other substituents attached to the nitrogen, and upon the number of reactive anionic radicals in the polymeric component, modifications in the properties of the polymer can be made within a very wide range. For example, a rigid and brittle styrene-acrylic acid copolymer can be transformed into either a horny, or a hard flexible, or a soft elastic, or a gummy sticky material, depending upon the length of the alkyl chain, its branching, and upon the number of such long chain alkyl radicals present in the substituted ammonium derivative. Considerable improvement is possible if more than one long chain alkyl radical is attached to the nitrogen as a substituent for the hydrogen in the cationic ammonium derivative. Thus, for example, an enhanced plasticising effect may be obtained if with one cationic reactive radical, two or more long alkyl chains are introduced, rather than only one. In this manner, a lesser number of reactive anionic radicals are needed in the polymeric component and hence any one of a much greater number of polymeric components may be selected for use in the practise of the invention, with a resultant wide choice as to the character of the product thereby obtained.

The reaction can be carried out by reacting all of the available active hydrogen producing radicals, such as carboxyl, sulfonic, sulfuric, and phosphoric radicals.

In the practise of the invention, all of the active hydrogen producing anionic radicals may enter into the reaction to form the water-insoluble salt, or the reaction may be carried out in a manner such that only part of the anionic radicals forms the salt, the unreacted radicals becoming available for further modification of the polymer, such as by cross-linking.

The reaction between the anionic polymer and the cationic ammonium derivative can be carried out in a solution in a suitable solvent, or by mixing the two constituents at or above the softening point of the polymer, in a suitable internal mixer or kneading machine, such as a Werner-Pfleiderer mixer. The latter method has the advantage that it enables the reaction to be carried out with high molecular weight polymers which are not soluble in solvents or which may give a very viscous solution at relatively low concentrations. In certain instances, it may be of advantage to add a limited quantity of solvent to the mass in the kneading or mixing machine, the solvent being recovered from the machine after the mixing is completed.

To produce stable water dispersions, hydrotropic surface active agents which solubilize the polymeric salt can be used. During or after polymerization, suitable emulsifying and dispersing agents can be added to the solution of the polymer or to the monomeric compounds from which the polymer will form. If part of the anionic radical in the polymer remains unreacted, a water dispersion can be made by mixing with the polymer or with its solution, a dilute water solution of an alkaline material such as ammonia, alkylamines, alkanolamines, potassium hydroxide and the like.

The polymeric anionic compounds to be used in the practise of the invention may be those obtained from ethylenically unsaturated monomers with anionic substituents, such as polymers derived from acrylic acid and styrene sulfonic acid, but the preferred type are those obtained by copolymerizing ethylenically unsaturated monomers such as hydrocarbons or esters, ethers, etc. with the monomers to which the salt-forming radical is attached. Examples of the latter are acrylic and methacrylic acids, maleic, fumaric and itaconic acids, crotonic acid, styrene sulfonate, etc.

It is known to those skilled in the art of polymerization that a wide variety of polymers can be obtained by selecting the type and ratio of various monomers used in the polymerization. The mol ratio of the salt-forming monomers to the mol ratio of the neutral (non-ionic) monomer or monomers used will determine approximately the combining weight or the number of anions in the polymer. Suitable film properties can be obtained for a great number of uses by combining ethylenically unsaturated monomers selected from a great variety of compounds and in mol ratios of a wide range. Polymers can be produced, for example, by polymerizing or copolymerizing ethylenically unsaturated anionic monomers with acrylic esters or methacrylic esters, styrene and acrylic esters, butadiene and styrene, butadiene and acrylonitrile, vinyl acetate and di-butyl fumarate. The anionic equivalent weight of the polymer produced can be varied by adjusting the mol ratios accordingly.

The quaternary substituted ammonium derivatives to be utilized in the practise of the invention fall within several groups. One group comprises quaternary ammonium salts having the following type formula:

(A) 

where: $R_1$ is hydrogen, lower alkyl or alkylol; $R_2$ and $R_3$ are alkyl, alkylol, aryl or aralkyl; $R_4$ is a long chain alkyl radical containing from 8 to 22, preferably 12 to 22, carbon atoms in straight or branched arrangement, with or without aryl or alkaryl substituents; and A is an anion such as halogen, sulfate, acetate, hydroxyl or the like. Of this group, we have used, among others, Cetyl-dimethyl-benzyl-ammonium chloride
Trimethyl-cetyl-ammonium bromide
Diisobutyl phenoxy ethoxy ethyl-dimethyl-benzyl-ammonium chloride
9 octadecenyl-dimethyl-ethyl-ammonium chloride
Dodecyl-dimethyl-o chlorobenzyl-ammonium chloride
p tertiary octyl phenoxyl ethyl-dimethyl-benzyl-ammonium chloride
Myristoyl ethyl-dimethyl-benzyl ammonium chloride
1 hydroxyethyl-2 tetradecyl-3 benzyl ammonium chloride
Methyl-dodecyl-dibutyl-ammonium chloride
Dimethyl-decyl chlorobenzyl-ammonium chloride Within the group represented by Formula A above, there falls a sub-group, herein designated sub-group (I), of quaternary ammonium salts which may be used, and which in certain instances are preferred for use, in the practise of the invention. This sub-group (I) comprises those of such salts of the Formula A wherein two of the substitutents are long chain alkyl radicals containing 8 to 22 carbon atoms in straight or branched arrangement, with or without aryl or alkaryl substituents. Included among the quaternary ammonium salts of this sub-group, utilized in the practise of the invention are Di-dodecyl-dimethyl-ammonium chloride
Di-dodecyl-benzyl-methyl-ammonium chloride
Di-octyl-dodecyl-benzyl-ammonium chloride
Methyl-di-octyl-benzyl-ammonium chloride
Methyl didodecyl-decyl ammonium iodide
Methyl-didodecyl-benzyl-ammonium bromide
Dimethyl-dodecylbenzyl-nonyl-ammonium chloride
Di-dodecyl-dimethyl-ammonium chloride
Di-hexadecyl-dimethyl ammonium sulfate Thus, as represented by the quaternary ammonium salts here mentioned as illustrative of this sub-group (I), substituents $R_3$ and $R_4$ in Formula A above, should be octyl, nonyl, decyl and other higher alkyl radicals containing up to 22 carbon atoms. Substituent $R_2$ may be alkyl having 8 to 18 carbon atoms. As above indicated, these substituents may be either straight or branched chain substituents, such as tertiary alkyls, including not only tertiary octyl, tertiary decyl and tertiary dodecyl, but also higher tertiary alkyls, which are available as mixtures of various chain lengths and as isomers of 12 to 22 carbon atoms in the chain. Primary amines from which the quaternary ammonium derivatives can be made are commercially available from Rohm and Haas Company under the trade designations Primene 81R and JM–T, these amines corresponding to the formula $RNH_2$ in which R is tertiary alkyl with $C_{12}$ to $C_{14}$ and $C_{18}$ to $C_{22}$ atoms, respectively. The advantage of the tertiary alkyls is their great stability against oxidation. The quaternary ammonium compounds are prepared from the amines by reacting them with alkyl iodides.

In the quaternary ammonium salts of the sub-group (I) referred to above, it is preferable in many instances, in order to obtain desired performance, to have present alkyl substituents of different chain lengths. Thus, for example, in formula A above, $R_3$ may be dodecyl while $R_4$ is octyl, or $R_3$ may be heptadecyl while $R_4$ is decyl, or $R_3$ is decyl while $R_4$ is octyl, or $R_3$ is nonyl while $R_4$ is undecyl. The alkyl chain can also be attached to an aromatic nucleus, as typified by octyl or nonyl benzenes, or dodecyl phenols, which may be introduced as their chlorides into the amines, to form the quaternary ammonium derivative. Thus, in Formula A above, $R_3$ can be a dodecylbenzyl radical while $R_4$ is simply an alkyl radical of 8 to 22 carbon atoms.

Another sub-group of quaternary substituted ammonium derivatives, herein designated sub-group (II) which may be utilized in the practise of the invention comprises those quaternary ammonium salts having Formula A above, but wherein each of the substituents $R_2$, $R_3$ and $R_4$ is an alkyl radical containing at least 6 carbon atoms in straight or branched chain arrangement, with or without aryl or alkaryl substituents. An example of such a derivative is tricapryl monomethyl bromide.

Still another group of quaternary substitued ammonium derivatives, herein designated sub-group (III) capable of use in the practise of the invention comprises diquaternary ammonium salts of the formula (III) 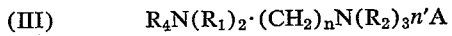

in which $R_1$, $R_2$, $R_4$ and A are each, respectively, as set forth in (I) above, $n$ is an integer from 2 to 10, and $n'$ is an integer from one to two. Thus, for example, a quaternarized N-alkyl propylene diamine may be made by methylation of the fatty amine to give, when $R_4$ is dodecyl, a diquaternary ammonium dichloride of the formula

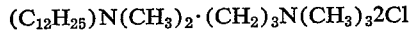

Other examples of diquaternary compounds that may be used are alkyl ($C_8$ to $C_{22}$) quaternized dipropylene diamine dihalides or hydroxides. Since the equivalent weights of the diquaternary ammonium derivatives are half of the molecular weights, the reaction with the anionic polymers can be carried out by reacting only one of their valences, leaving the other valence free for other reactions, if desired.

Still another group of quaternary substituted ammonium derivatives, herein designated sub-group (IV) which may be used in practising the invention are heterocyclic derivatives of nitrogen, having the general formula (IV) 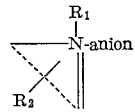

where N is an element in a heterocyclic ring, $R_1$ is selected from the group consisting of hydrogen, lower alkyl, lower alkylol, aryl and aralkyl, and $R_2$ is a long chain substituent containing 6 to 22, desirably 8 or more, carbon atoms in the chain. Typical of this group are lauryl morpholinium, imidazolium, pyridinium and quinolium compounds, specific examples of which are N-benzyl-N higher alkyl (more than 10 carbon atoms) morpholinium halides, N-alkyl-dialkyl-imidazolinium chloride (with the long chain substituent preferably on the ring, and not on the active nitrogen), N-lauryl-methyl-pyridinium chloride, and N-lauryl-quinolinium bromide. The heterocyclic ring in the compounds of sub-group (IV) can also be used to form a diquaternary compound, as represented by the formula herein designated sub-group (V)

(V) 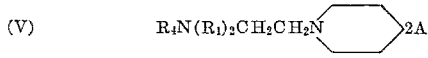

where $R_1$ is as set forth in (I) above, and $R_4$, again, is a long chain alkyl radical containing 8 to 22 carbon atoms. Another form of diquaternary compound typical of heterocyclic derivatives of nitrogen which may be employed in practising the invention is represented by the formula, herein designated sub-group (V)

(VI) 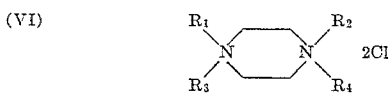

this being a substituted piperazolium chloride made by reacting ethylene dichloride with a long chain secondary amine or amines and can be an N,N' dialkyl (octyl, decyl, etc.) methylene dipiperazolium dichloride.

Sulphur, selenium and tellurium also can form substituted quaternary derivatives which can be used in the practise of the invention, in lieu of the ammonium derivatives in which the four carbon atoms are linked to the nitrogen atom through covalent links and the anion is linked to the nitrogen through electrovalent bonds. In the heterocyclic compounds the nitrogen is linked through two carbon nitrogen covalent bonds. All of the above mentioned compounds belong to the class of so-called "onium" compounds.

An advantage of using synthetic ethylenic polymers in our invention, in distinction from other polymers, lies in the ease with which the physical and chemical properties of the resultant reaction products can be controlled. This control can be obtained by adjusting the molecular weight of the anionic polymeric component, or by selecting monomers for making homo- or copolymers from a great variety of aliphatic or aromatic ethylenically unsaturated monomers, or by varying the ratio of active hydrogen producing monomers to the other monomers. If the ratio of carboxylic or sulfonic acid is high in the polymer, the films obtained from the reaction product with the quaternary ammonium component tends to be soft and flexible; with the same polymeric component but with a low ratio of anionic component, the films may be hard and stiff. If the molecular weight of the polymer is high, the films tend to be strong, dry and elastic—if low molecular weight polymers are used, the films tend to be weak, soften and to become sticky at lower temperatures, and useful principally in adhesives. Thus, a wide range of physical and chemical properties can be obtained.

Still another advantage of the products derived from these polymers is the fact that they are soluble in common organic solvents.

Solubilization of our products can also be effected, in certain cases, by the use of strong solutions of hydrotropic salts, e.g., various aromatic sulfonates. From these colloidal solutions, the compounds of the invention can be recovered by the addition of more water. Examples of suitable aromatic sulfonates are sodium xylene sulfonates, sodium p-cymene sulfonate, potassium benzene sulfonate, ammonium toluene sulfonate, and the like. Some surfactants have also been found to be solubilizers—e.g., Igepal CA—a non-ionic surfactant obtained by condensing dodecyl phenol with about 12 mols of ethylene oxide. Solution is obtained in these cases by dissolving the solubilizer in water, and treating our compounds with the solution; swelling and eventual disintegration to a turbid solution occurs on pronlonged standing and agitation.

The property of being soluble in organic solvents is particularly useful where additions are to be made to such products as surface coatings, waxes and the like.

Not only can our materials be added to films of other materials, but they can, by proper selection of polymeric constituents, be used as the major film forming constituent of coatings for paper, fabrics, other unsupported films, or as paint vehicles.

The following examples will illustrate the invention.

EXAMPLE 1

To 10 cc. of a 25% aqueous solution of the ammonium salt of polyacrylic acid, used in form of a commercial product called Polyco 329, a solution of 12 g. of dimethyl-benzyl-alkyl-ammonium chloride (with the alkyl averaging $C_{12}H_{25}$) in 50 cc. water was added under stirring. A plastic product separated which could be washed free of chloride by stirring with water and decantation. This plastic product formed water-insoluble, somewhat elastic films of considerable strength. The films were not soluble in ammonia water, but swelled in benzoyl; they are soluble in ethyl, methyl and butyl alcohols.

EXAMPLE 2

50 parts of ammonium polyacrylate having an equivalent weight of 230 with respect to the carboxyl, are dissolved to a 15% aqueous solution, and reacted with 82 parts of benzyl-dimethyl-octadecyl ammonium chloride having an eqivalent weight of 400, dissolved in an equal amount of water. The reaction is carried out by pouring the solution of the quaternary ammonium compound into the polyacrylate solution under continuous stirring and adjusting the pH of the reaction mixture to 9.0 by the addition of ammonia. Both solutions are heated to about 60° C. and the solution of the quaternary ammonium compound is poured into the solution of the acrylic acid salt under continuous agitation.

In the reaction a gelatinous product is formed which changes into a highly hydrated precipitate during stirring. It separates from the water phase which is then removed by filtration.

The reaction product is a soft, flexible, sticky mass, extensible and elastic. Its films are quite different from polyacrylic acid films which are brittle. This may be due to the relatively great number of quaternary ammonium radicals combining with the acid radical of the polymer.

The product is practically insoluble in water, and swells in toluene, trichlorobenzene, nitromethane, without dissolution. It is soluble in alcohols such as methanol and ethanol, and films can be obtained from these solutions. It is not dispersed in detergent solutions, such as Igepal CA, Duponol G, or in an excess of the quaternary ammonium compound.

EXAMPLE 3

50 parts by weight of ammonium polymethacrylate and 80 parts by weight of benzyl-dimethyl-octadecyl ammonium chloride having an equivalent weight of 400, are reacted in water solution. The reaction product forms a precipitate and can be processed in the manner described in Example 2.

The properties of the resulting product are similar to those of the product obtained in Example 2.

EXAMPLE 4

*Alkyl methyl benzyl dimethyl ammonium polyacrylate*

The reactants employed were Onyx oil BTC 471 ($C_{12}$ to $C_{14}$ mixed alkyl-ethyl benzyl-dimethyl ammonium chloride) and Goodrich Chemicals Goodrite 707 (a medium molecular weight ammonium polyacrylate).

19.5 grams of the quaternary salt were dissolved in 19.5 grams water.

2.8 grams of KOH were dissolved in 70 grams of methanol. The solutions were mixed; the KCl formed precipitated, yielding a 17.5% solution of the free base in dilute methanol.

The ammonium polyacrylate was made into a 15% aqueous solution; and this solution, containing 1.5 grams of the polyacrylate, was mixed with methanol solution containing 8.2 grams of free quaternary base. A voluminous, soft sticky precipitate formed. The supernatant liquid was milky, but became clear on the addition of 100 grams of water. The precipitate was then filtered, washed and dried at 80° C. The yield was 10.2 grams.

EXAMPLE 5

To compare the effect of changing the quaternary ammonium compound, the polyacrylate of Example 4 was reacted with p-diisobutyl phenoxy-ethoxy-ethyl-dimethyl-benzyl ammonium chloride (Hyamine 1622—Rohm and Haas).

3.75 grams of the ammonium polyacrylate (a slight excess) in 220 grams water was mixed with
11.5 grams of the quaternary salt in
110.0 grams water The precipitate was filtered, washed free of chloride, and dried at 80° C. It was dry without tack, and slightly elastic, and differed considerably in appearance from the product of Example 4. Yield 11.8 grams.

EXAMPLE 6

SOLUTION A

| | Grams |
|---|---|
| Vinyl acetate - maleic acid copolymer 7% carboxyl—50,000 mol. wt. (Monsanto C-3) | 10.00 | was dissolved in

| | |
|---|---|
| Water | 97.00 |
| 27% ammonia | 3.00 |

SOLUTION B

| | Grams |
|---|---|
| Alkyl ($C_{12}$ to $C_{14}$)—ethylbenzyl-dimethyl ammonium hydroxide | 0.87 | was dissolved in a mixture of

| | |
|---|---|
| Ethyl alcohol | 5.00 |
| Water | 50.00 |

On mixing, a voluminous precipitate formed; it was washed free of excess quaternary ammonium compound by filtration; this was precipitated with a small additional quantity of solution A. The two precipitates were dried at 80° C. We obtained 9.5 grams of a tough, light yellow, somewhat elastic material, which was soluble in butanol—a 10% solution was somewhat viscous. Although the original vinyl acetate resin was a brittle solid, the reaction product was elastic and flexible, and could be used either in coatings, or in the preparation of unsupported films.

EXAMPLE 7

The quaternary ammonium salt was Onyx oil BTC 927—mixed alkyl ($C_{12}$ to $C_{14}$)—dimethylbenzyl - dimethyl ammonium chloride—and the acid polymer was a styrene maleic acid copolymer (Montanto Lustrex 810) with an acid number of 320 (mg. KOH equivalent per gram of resin)

20.0 grams Lustrex 810
380.0 grams water
6.5 grams KOH gave a solution with pH 8.3. This was mixed with a solution obtained by blending 200.0 grams of water with
81.6 grams of a 50% solution of the quaternary ammonium compound in water (as obtained commercially)

The precipitate obtained was a coherent mass. It was filtered, washed free of chlorides, and dried. Yield 49.1 grams. The product was light yellow, elastic and flexible, soluble in a 1:1 mixture of methyl ethyl ketone and isopropyl alcohol.

EXAMPLE 8

A copolymer of styrene and acrylic acid was formed from a styrene monomer of 99.2% purity, inhibited with 0.1% hydroquinone methyl ether and glacial acrylic acid of 99.8% purity, inhibited with 0.1% hydrochinon methyl ether. The following proportions were used:

| | Grams |
|---|---|
| Styrene | 250 |
| Acrylic acid | 154 |
| Ethanol | 350 |

Copolymerization was carried out in a three-neck flask equipped with a stirrer, thermometer and reflux condenser at 86° C. under reflux. After refluxing started, 4 grams of benzoyl peroxide initiator, were added. The content of the flask became gradually more and more viscous. After five hours, the contents were cooled and discharged. A viscous solution of 47.5% solids content, and having a viscosity of 4,000 cps. (Brookfield viscosimeter Model LVF, spindle 4, at 30 r.p.m.) was obtained.

For determination of the anionic equivalent, 100 grams of the solution were poured into excess water, the copolymer precipitated and washed to remove unreacted acrylic acid, and dried at 80° C. Two grams of copolymer were dissolved in 50 ml. alcohol and titrated with half-normal KOH, using phenolpthalein as indicator. One gram copolymer required 2.1 ml. normal alkali solution for neutralization, thus calculating to the equivalent weight of 475. The copolymer formed a clear, very brittle film, insoluble in water, soluble in dilute alkali, such as $NH_4OH$ or KOH. It was soluble in alcohol, ketones and esters. It was insoluble in Stoddard solvent but did swell in benzene and carbon tetrachloride. Its brittle point was 112° C.

The purified anionic copolymer was dissolved in dilute ammonia and the calculated equivalent weight of dodecyl-trimethyl ammonium chloride was added. The latter quaternary derivative was a commercial product of Armour and Company with a combining weight of 304. Upon its addition to the ammonia solution of the anionic copolymer, a precipitate was formed, which was separated, washed and dried at 80° C. The product, dodecyl trimethyl ammonium styrene acrylate was hard, flexible at 40° C., brittle at 20° C. It was insoluble in water and in dilute ammonia solution. After prolonged immersion in water, it became white, and a weight increase of 12% was found on determining the amount of water taken up.

EXAMPLE 9

The purified anionic copolymer prepared as described in Example 8, dissolved in dilute ammonia, was reacted with the calculated equivalent of didodecyl dimethyl ammonium chloride. The latter quaternary derivative was of a combining weight of 515. The reaction product of this example was soft, extensible, elastic at 20° C., becoming sticky at 40° C., and showing cold flow even at room temperatures. It was insoluble in water, and its appearance was unchanged after submersion in water for 48 hours, with a weight increase of 2%. It was soluble in aromatic hydrocarbons such as benzene and carbon tetrachloride.

Thus, by comparing the product of this example with that of Example 8, it will be seen that the presence of two long alkyl chains, substituted on the nitrogen of the quaternary ammonium derivative, greatly enhances the plasticizing effect, and otherwise improves the physical properties of the polymer.

EXAMPLE 10

The same reaction products as obtained in Examples 8 and 9 were obtained when the equivalent weights of the respective substituted quaternary ammonium hydroxides, in lieu of the chlorides, were mixed with the copolymer obtained from the same proportions of the styrene and acrylic acid as mentioned in those examples, using however azobisbutyronitrile, instead of benzoyl peroxide, as catalyst or initiator. The combining weight of the copolymer obtained was here again determined by titration in an alcoholic solution of purified copolymer. This was calculated to be 270, indicating that the copolymerization in this instance was more complete than in the instance of Examples 8 and 9. In the above reactions, the combining weights of each component was used and the resulting salt was neutral. The reaction product of the copolymer with the dodecyl trimethyl ammonium hydroxide was flexible at 20° C., and with the didodecyl dimethyl ammonium hydroxide it was soft and elastic, becoming gummy and very sticky at 40° C. Thus, the foregoing demonstrates the function of the number of carboxylic radicals in the polymer, and consequently the influence of the increased number of long chains attached to the polymer.

EXAMPLE 11

Instead of the dodecyl derivatives referred to in the foregoing examples, a tertiary tridecyl trimethyl ammonium hydroxide was used—again, in the same molecular ratio; also, a tertiary ditridecyl methyl benzyl ammonium hydroxide. In each instance, the reaction was carried out in the alcoholic solution of the copolymer. The solids content of the original solution was 53.7% and free-flowing solutions were obtained after the addition of the cationic components, resulting in a considerable increase of the solids content. The product obtained with tridecyl trimethyl ammonium hydroxide was a hard brittle material at 40° C. With ditridecyl methyl benzyl ammonium hydroxide, a reaction product was obtained which was flexible, elastic and much harder than with the dodecyl derivative. The product remained flexible without losing much strength at 40° C. By the present example, therefore, compared with Examples 8, 9 and 10, is demonstrated the difference in the results obtained with straight chain and with branched chain substituents in the quaternary substituted ammonium component.

EXAMPLE 12

A terpolymer, softer and having more flexibility than the styrene-acrylic acid copolymer of Examples 8 et seq., was utilized. It exhibited more softening and change in physical properties with both the mono long chain alkyl and with the di long chain alkyl substituted ammonia derivatives.

The polymerization was carried out as described in Example 8.

The monomers and the relative amounts thereof used were as follows:

| | |
|---|---|
| Methyl methacrylate, inhibited with 0.1% hydroquinone methyl ether _____grams__ | 75 |
| Ethyl acrylate, inhibited with 0.1% hydroquinone methyl ether _____grams__ | 125 |
| Glacial methacrylic acid, inhibited with 0.05 hydrochinon methyl ether _____grams__ | 120 |

The solvent was:

| | |
|---|---|
| Ethyl acetate _____do____ | 100 |
| Toluol _____do____ | 150 |
| Initiator-benzoyl peroxide _____do____ | 2.5 |
| Polymerization temperature _____° C__ | 78 |
| Solids _____percent__ | 44.7 |
| Viscosity _____cps__ | 5000 |
| Combining weight _____ | 880 |

The film obtained after evaporation of the solvent was tough, colorless, transparent, flexible at 20° C., showing a high modulus. At 40° C., it was still fairly tough and flexible.

A 55 gram solution containing 25 grams of the terpolymer was mixed with a 20% alcoholic solution of lauryl trimethyl ammonium hydroxide (combining weight 304). The reaction took place during mixing, first producing a thick separation which changed into a smooth solution. The film recovered from the solution was flexible, and elastic, and recovered fast after stretching.

EXAMPLE 13

Instead of the mono long alkyl substituted ammonium derivative of Example 12, dilauryl dimethyl ammonium hydroxide with a combining weight of 516 was used. To 55 grams solution containing 25 grams of the terpolymer, 95 grams of 20% solution of the ammonium derivative, i.e., a solution containing 19 grams of the dilauryl derivative, was added. The film recovered from this solution was much softer than that of Example 12, and showed very slow, sluggish recovery after stretching.

In order to demonstrate the anti-static property of the products obtained hereby, a Dacron fabric was rubbed with a glass rod (held in hand covered with rubber glove) and the bowl of an electroscope was touched with the fabric. The leaves of the electroscope immediately went apart, indicating generation of static electricity. The fabric was impregnated with dilute solutions of the products of Examples 12 and 13, adjusting for a pick-up of about 5%. No static charge could be generated from the thus impregnated fabric.

EXAMPLE 14

Instead of the dodecyl and didodecyl substituted quaternary ammonium derivative referred to in previous examples, a palmityl dimethyl benzyl ammonium hydroxide and a dipalmityl methyl benzyl ammonium hydroxide was used in the same molecular ratio. The resulting films were softer than those of the previous examples, but otherwise a similar effect was obtained.

The effect of the decyl dimethyl benzyl ammonium hydroxide was less, and the film was harder and less flexible than in the case of the dodecyl or the palmityl substituted products. The didecyl methyl benzyl ammonium hydroxide gave a film which was quite similar to that obtained with the palmityl dimethyl benzyl ammonium derivative of the anionic acrylic polymer. The anti-static influence of the dodecyl substituted polymer was the same.

EXAMPLE 15

In this example, the reaction between polymer and the quaternary ammonium derivative was carried out by mixing the two ingredients in an internal mixer.

The polymer used was a high molecular weight (about 50,000) terpolymer made by copolymerizing 40 parts styrene, 50 parts ethyl hexyl acrylate and 10 parts acrylic acid, using the delayed monomer addition technique, and using 0.2 part potassium persulfate as initiator. The resulting polymer was flexible, tough, and could be masticated in the Werner-Pfleiderer type internal mixer by heating it to 50° C. It was not soluble in ammonium hydroxide solution, although it did swell up, and was only partially soluble in toluene, indicating some gel formation during the polymerization reaction. Its combining weight was determined in a solution with half-normal alcoholic KOH. The combining weight was 810.

100 grams of this polymer were masticated until it gave a smooth dough at 50° C. Then 70 grams of commercial dimethyl dihydrogenated tallow ammonium hydroxide dissolved in iso-propyl alcohol were added. The fatty alkyl chain of the aforesaid quaternary ammonium derivative consisted of 5% $C_{14}$ (myristoyl) radicals; 30% $C_{16}$ (palmityl) radicals and 65% $C_{18}$ (stearyl) radicals.

The quaternary compound was taken up in 45 minutes by the polymer, mixing in rapidly after about one-third of it was added. The resulting product was very soft, had a much lower plasticity and could be formed at room temperature.

EXAMPLE 16

In this example, the cationic compound was a quaternized diamine, namely, N coco N-N-dimethy-t,n,n',n", trimethyl 3-propylene diammonium chloride, with a combining weight of 190. This compound is a product of General Mills, designated as Aliquat 721.

From this diquaternary compound, the hydroxide was prepared by reacting it in equal molecular proportions with KOH in alcoholic solution. In this manner, only one of the chlorines was replaced by hydroxide.

A terpolymer was prepared from the following monomers:

|  | Grams |
|---|---|
| Acrylonitrile | 106 |
| Butyl methacrylate | 73 |
| Acrylic acid | 72 | using 250 grams methyl ethyl ketone as solvent, and 3 grams of azobisbutyronitrile as initiator of the polymerization. The polymerization reaction was carried out under reflux.

A solution containing 30 grams of the acrylonitrile-butylmethacrylate-acrylic acid terpolymer was mixed with a solution of the above mentioned diquaternary half hydroxide in isopropyl alcohol containing 36 grams of the diquaternary. The reaction product isolated therefrom gave a flexible, rather tough film. This reaction product still had one reacting substituted nitrogen radical available.

EXAMPLE 17

In this example, there is illustrated the preparation of water dispersions of reaction products embodying the invention.

To 62 grams of solution containing 30 grams of the acrylonitrile-butylmethacrylate-acrylic acid terpolymer prepared as described in Example 16, there were added 82 grams of tallow trimethyl ammonium hydroxide solution in isopropyl alcohol containing 40% solids. The tallow trimethyl ammonium hydroxide was a commercial product sold as Arquad T-50 by Armour and Company.

After evaporation of the solvent from the above-mentioned reaction product, a fairly soft, flexible residue remained. The solution of this reaction product had a solids content of 45%.

To 100 grams of this solution there were added 2.5 grams of a non-ionic emulsifier, consisting of a nonyl phenol ethylene oxide condensation product containing eight ethylene oxide groups attached to the nonyl phenol. 100 grams of a 5% ammonium hydroxide solution were added slowly with vigorous agitation into the solution of the polymeric reaction product. A turbid emulsion was obtained which could be further diluted with water.

When, instead of all the available carboxyl, only half was reacted with the quaternary ammonium compound, using only 41 grams (instead of 82 grams) solution of the above-mentioned quaternary, no emulsifying agent was required in order to obtain the emulsion. In lieu thereof, a 5% morpholine solution was used, and the emulsification was carried out at 45° C., to reduce the viscosity during emulsification. A translucent water dispersion was obtained, having a much higher viscosity than the emulsion of the polymeric quaternary ammonium salt in which no reactive anionic radical remained. By the formation of the morpholin salts, with the carboxyls unreacted, water dispersibility was obtained.

The same behavior was exhibited by the polymer reacted with the ditallow dimethyl ammonium hydroxide.

EXAMPLE 18

The solution of the half salts of the polymers may be treated in order to bring about cross-linking, as by adding zinc chloride thereto. Thus, to the solution containing 46 grams of the reaction product referred to in Example 17, there were added 3 grams of zinc chloride in an alcoholic solution. After evaporation of the solvent at 50° C., the film was heated to 90° C., for 30 minutes. The film was found to be no longer soluble in methyl ethyl ketone, indicating cross-linking by the bivalent zinc metal. Instead of zinc chloride, other known bifunctional cross-linking agents known in the art, such as diepoxies and polyamines reacting with the carboxyl, may be used. An example of such a diepoxide cross-linking or curing agent is the diepoxide designated AG-13E of Rohm and Haas Company.

EXAMPLE 19

The anionic polymer used in the example was the styrene-acrylic acid copolymer with a combining weight of 270 as described in Example 10.

The quaternary nitrogen derivative was a 1(2-hydroxyethyl) 2-heptadecenoyl-benzyl imidazolium chloride (commercially available from National Aluminate Company under the designation Nalquat G-8-13) with a combining weight of 500.

The ammonium salt of the styrene-acrylic acid copolymer was used and was mixed with the above-mentioned imidazolium derivative. To 27 grams of the styrene-acrylic acid copolymer were added 50 grams of the imidazolium chloride in a dilute solution. A voluminous precipitate, highly hydrated with water, was formed. This was separated and washed free of chlorine. After drying, this reaction product yielded a solid, soft, very sticky, somewhat elastic film.

This example illustrates the influence of various radicals besides the long chain alkyl in the molecule. Benzyl and the heterocyclic ring both have a plasticizing effect comparable to the dilauryl dimethyl ammonium chloride. Instead of the imidazolium derivative, a lauryl iso-quinolinium bromide (Onyx Chemical Company produced designated Isothan Q 15) with a combining weight of about 400 was used. Again, equal molecular ratio was used to produce the polymeric salt. The resulting product was a semi-liquid mass, which changed on drying at 80° C., to a hard, but flexible, film of red color.

As will be apparent from the foregoing description, the products of our invention have as distinguishing characteristics a high molecular weight, as they are formed by reaction of quaternary ammonium compounds with polymeric reactants having a molecular weight of 2000 or more, and up to 100,000; substantial insolubility in water; capability of forming films of varying properties depending upon the factors hereinabove set forth; and miscibility with many organic coating materials.

We claim:

1. A film-forming internally plasticized composition consisting essentially of a water-insoluble reaction product of an anionic polymer and a cationic quaternary ammonium compound, said reaction product being selected from the group consisting of:

(I) those quaternary ammonium salts having the formula

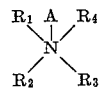

in which $R_1$ is selected from the group consisting of hydrogen, lower alkyl and lower alkylol, $R_2$ is selected from the group consisting of alkyl, alkylol, aryl and aralkyl, $R_3$ and $R_4$ are each selected from the group consisting of a long chain carbon substituent having 8 to 22 carbon atoms in straight and branched chain arrangements, not necessarily the same, and A is an anionic radical having a molecular weight of at least 2000 and derived from a synthetic polymer of the group consisting of homo and copolymers of ethylenically unsaturated compounds, said polymer containing an active hydrogen capable of salt formation with the quaternary ammonium compound;

(II) those quaternary ammonium salts having the formula set forth in (I) above, in which $R_1$ is as therein set forth, and in which each of $R_2$, $R_3$ and $R_4$ is an alkyl of at least 6 carbon atoms in straight and branched chain arrangements, and A is as set forth in (I) above;

(III) those diquaternary ammonium salts having the formula $$R_4N(R_1)_2 \cdot (CH_2)_nN(R_2)_3n'A$$

in which $R_1$, $R_2$, $R_4$ and A are each, respectively, as set forth in (I) above, $n$ is an integer from 2 to 10, and $n'$ is an integer from those of one and two;

(IV) those heterocyclic derivatives of nitrogen having the formula

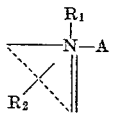

in which N is an element in a heterocyclic ring, $R_1$ is selected from the group consisting of hydrogen, lower alkyl, lower alkylol, aryl and aralkyl, and $R_2$ is a long chain carbon substituent containing 6 to 22 carbon atoms in straight and branched chain arrangements, and A is as set forth in (I) above;

(V) those heterocyclic derivatives of nitrogen having the formula

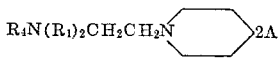

in which $R_1$, $R_4$ and A are each respectively, as set forth in (I) above; and (VI) those heterocyclic derivatives of nitrogen having the formula

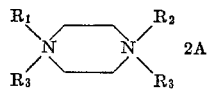

in which $R_1$, $R_2$, $R_3$, $R_4$ are each, respectively, as set forth in (I) above.

2. A film-forming composition as defined in claim 1, wherein said reaction product is a member of the said group (I) and in which $R_2$ is an alkyl having 8 to 18 carbon atoms.

3. A film-forming composition as defined in claim 2, wherein said reaction product is a didodecyl dimethyl ammonium salt.

4. A film-forming composition as defined in claim 1, wherein the anionic radical is derived from a terpolymer of three ethylenically unsaturated monomers.

5. A film-forming composition as defined in claim 1, wherein said reaction product is a member of said group (III) and has the formula $$(C_{12}H_{25})N(CH_3)_2N(CH_3)_3 2Cl$$

6. A film-forming composition comprising an aqueous dispersion of a reaction product as defined in claim 1.

7. A film-forming composition comprising a solution, in an organic solvent, of a reaction product as defined in claim 1.

References Cited by the Examiner
UNITED STATES PATENTS

| | | | |
|---|---|---|---|
| 2,435,777 | 2/1948 | Glavis et al. | 260—86.1 |
| 2,435,950 | 2/1948 | Neher et al. | 252—77 |
| 2,984,639 | 5/1961 | Stamberger | 260—32.4 |

JOSEPH L. SCHOFER, *Primary Examiner.*

HAROLD BURSTEIN, LEON BERCOVITZ, *Examiners.*

UNITED STATES PATENT OFFICE
CERTIFICATE OF CORRECTION

Patent No. 3,219,639                      November 23, 1965
Walter M. Fuchs, deceased, by
Frieda W. Fuchs, sole heir, et al.

It is hereby certified that error appears in the above numbered patent requiring correction and that the said Letters Patent should read as corrected below.

In the heading to the printed specification, lines 2 to 4, for "POLYMERIC QUATERNARY AMMONIUM SALT COMPOSITIONS AND METHOD OF MAKING THE SAME" read -- POLYMERIC QUATERNARY AMMONIUM SALT COMPOSITIONS --; column 5, line 18, for "sub-group (V)" read -- sub-group (VI) --; line 68, for "sulfonates" read -- sulfonate --; column 6, line 23, for "benzoyl" read -- benzol --; column 9, line 66, for "120" read -- 20 --; column 12, line 39, for "produced" read -- product --.

Signed and sealed this 27th day of September 1966.

(SEAL)
Attest:

ERNEST W. SWIDER                      EDWARD J. BRENNER
Attesting Officer                    Commissioner of Patents